(12) United States Patent
Miyasaka et al.

(10) Patent No.: US 10,532,636 B2
(45) Date of Patent: Jan. 14, 2020

(54) LAMINATED GLASS FOR VEHICLE

(71) Applicant: AGC Inc., Chiyoda-ku (JP)

(72) Inventors: Seiichi Miyasaka, Chiyoda-ku (JP); Tokihiko Aoki, Chiyoda-ku (JP); Yuhei Gima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 217 days.

(21) Appl. No.: 15/471,403

(22) Filed: Mar. 28, 2017

(65) Prior Publication Data

US 2017/0282693 A1    Oct. 5, 2017

(30) Foreign Application Priority Data

Apr. 1, 2016 (JP) .................................. 2016-073921
Mar. 14, 2017 (JP) .................................. 2017-048922

(51) Int. Cl.

| | |
|---|---|
| *B32B 7/00* | (2019.01) |
| *B60J 3/04* | (2006.01) |
| *B32B 27/30* | (2006.01) |
| *B32B 7/12* | (2006.01) |
| *B32B 17/10* | (2006.01) |

(Continued)

(52) U.S. Cl.
CPC ...................................... *B60J 3/04* (2013.01); *B32B 7/12* (2013.01); *B32B 17/1055* (2013.01);

(Continued)

(58) Field of Classification Search
CPC ........ B60J 3/04; B32B 7/12; B32B 17/10036; B32B 17/10302; B32B 17/10532;

(Continued)

(56) References Cited

U.S. PATENT DOCUMENTS

2004/0176514 A1* 9/2004 Kubo ....................... C08K 3/22
                                                      524/431
2009/0176101 A1    7/2009 Greenall et al.
(Continued)

FOREIGN PATENT DOCUMENTS

EP        3085530        * 10/2016    ............. B32B 17/10
JP        2009-534283       9/2009
(Continued)

*Primary Examiner* — Michael L Leonard
(74) *Attorney, Agent, or Firm* — Oblon, McClelland, Maier & Neustadt, L.L.P.

(57) ABSTRACT

There is provided a laminated glass for vehicle including a suspended particle device film excellent in property of switching transmittance of light for a long term by suppressing deterioration over time of the suspended particle device film, in particular, deterioration due to intrusion of moisture at an end portion. A laminated glass for vehicle includes: a pair of glass plates opposing each other; a pair of intermediate bonding layers in contact with opposing surfaces of the pair of glass plates respectively; a suspended particle device film arranged in a predetermined region in a region corresponding to a region except at least a part of band-shaped regions of peripheral edge portions of a main surface of the glass plate, between the pair of intermediate bonding layers; and a barrier layer arranged in the band-shaped regions between the pair of intermediate bonding layers and having predetermined adhesiveness and predetermined moisture permeability.

10 Claims, 3 Drawing Sheets

(52) U.S. Cl.
CPC ...... *B32B 27/302* (2013.01); *B32B 17/10036* (2013.01); *B32B 17/10302* (2013.01); *B32B 17/10761* (2013.01); *B32B 17/10788* (2013.01); *B32B 2605/006* (2013.01)

(58) Field of Classification Search
CPC .......... B32B 17/1055; B32B 17/10761; B32B 17/10788; B32B 27/302
See application file for complete search history.

(56) References Cited

U.S. PATENT DOCUMENTS

| | | | |
|---|---|---|---|
| 2010/0206477 A1* | 8/2010 | Stammer | C08L 101/10 156/307.1 |
| 2012/0176656 A1 | 7/2012 | Boote et al. | |
| 2013/0008506 A1* | 1/2013 | Tanahashi | C08L 53/025 136/259 |
| 2015/0165965 A1 | 6/2015 | Masaki et al. | |
| 2015/0298431 A1* | 10/2015 | Von Der Weiden | B32B 17/10036 428/76 |
| 2016/0033841 A1* | 2/2016 | Gauthier | G02F 1/1339 359/245 |

FOREIGN PATENT DOCUMENTS

| | | |
|---|---|---|
| JP | 2013-505188 | 2/2013 |
| JP | 2015-821 A | 1/2015 |
| JP | 2015-78090 A | 4/2015 |
| JP | WO2016/006610 A1 | 1/2016 |

\* cited by examiner

LAMINATED GLASS FOR VEHICLE

CROSS REFERENCE TO RELATED APPLICATIONS

This application is based upon and claims the benefit of priority from the prior Japanese Patent Applications No. 2016-073921, filed on Apr. 1, 2016 and No. 2017-048282, filed on Mar. 14, 2017; the entire contents of which are incorporated herein by reference.

FIELD

The present invention relates to a laminated glass, further relates to a laminated glass for vehicle including a suspended particle device film.

BACKGROUND

As window glass intended for vehicle, a glass (smart glass) capable of electrically switching transmittance of light by on/off of a power supply switch has been known. As a functional material used for such a smart glass, there is a suspended particle device (hereinafter sometimes referred to as "SPD") film.

The smart glass is fabricated by sealing, for example, the SPD film in a laminated glass made by bonding glass plates with an intermediate bonding layer. In this event, for the purpose of protecting an end portion of the SPD film, the SPD film is cut into a size smaller than the sizes of the glass plates and the intermediate bonding layer and sealed in the laminated glass in a manner that the end portion is covered with the intermediate bonding layer. Specifically, the general configuration is that an intermediate bonding layer in a frame shape is arranged at a peripheral portion of the SPD film, the SPD film and the intermediate bonding layer are sandwiched between two intermediate bonding layers, and the two intermediate bonding layers are further sandwiched between a pair of glass plates.

However, even if the SPD film is sealed in the laminated glass as in the above, heat and moisture intruding from an end face of the laminated glass reach the end portion of the SPD film via the intermediate bonding layer, or the end portion deteriorates due to influence of a plasticizer contained in the intermediate bonding layer, resulting in a problem of becoming impossible to switch the light transmittance in response to on/off of the power supply switch at the end portion.

As means for preventing deterioration of the end portion of the SPD film sealed in the laminated glass, several techniques are suggested. For example, Patent Reference 1 (JP-A 2009-534283) describes a technique of using an intermediate bonding layer made of a material free from a plasticizer such as an ethylene-vinyl acetate copolymer resin in order to prevent intrusion of the plasticizer from the intermediate bonding layer. Further, Patent Reference 2 (JP-A 2013-505188) describes a technique of drying a constituent material of an intermediate bonding layer including an intermediate bonding layer in a frame shape to reduce the moisture content before fabrication of the laminated glass in order to suppress moisture intruding from the intermediate bonding layer in a frame shape.

SUMMARY

However, even if using these techniques, the intermediate bonding layer in a frame shape, when its width is small, for example, 10 mm or less, does not have sufficient durability against the intrusion of moisture from the end face of the laminated glass, leading to deterioration. Therefore, it has been hard to say that the laminated glass has sufficient durability when it is used in an outdoor environment all year long like an automobile even if using these techniques.

Thus, as a result of earnest examination, the present inventor has found out that when the intermediate bonding layer in the laminated glass has predetermined numerical values in terms of adhesiveness and moisture permeability, deterioration of the SPD film due to moisture can be suppressed.

An object of the present invention is to provide a laminated glass for vehicle including an SPD film excellent in property of switching transmittance of light for a long term by suppressing deterioration over time of the SPD film, in particular, deterioration due to intrusion of moisture at an end portion.

A laminated glass for vehicle of the present invention includes: a pair of glass plates opposing each other; a pair of intermediate bonding layers in contact with opposing surfaces of the pair of glass plates respectively; a suspended particle device film arranged in a predetermined region in a region corresponding to a region except at least a part of band-shaped regions of peripheral edge portions of a main surface of the glass plate, between the pair of intermediate bonding layers; and a barrier layer arranged in the band-shaped regions between the pair of intermediate bonding layers and having the following adhesiveness (A) and the following moisture permeability (B).

The adhesiveness (A): an adhesive strength to the glass plate is 40 N/25 mm or more, which is measured in conformity with JIS K 6864-2: 1999 under conditions of an adhesion temperature of 110° C., a test piece width of 25 mm, a testing rate of 300 mm per minute, and a peel angle of 180 degrees. The moisture permeability (B): a degree of moisture permeability at a temperature of 40° C. and a humidity of 90% RH measured in conformity with JIS Z 0208: 1976 is 50 g/m²-day or less.

According to the present invention, it is possible to provide a laminated glass for vehicle including an SPD film excellent in property of switching transmittance of light for a long term by suppressing deterioration over time of the SPD film, in particular, deterioration due to intrusion of moisture at an end portion.

DETAILED DESCRIPTION

Hereinafter, embodiments of the present invention will be explained. It should be noted that the present invention is not limited to these embodiments, and these embodiments may be changed or modified without departing from the spirit and scope of the present invention.

The laminated glass for vehicle of the present invention is a laminated glass including a pair of glass plates opposing each other and a pair of intermediate bonding layers in contact with opposing surfaces of the pair of glass plates respectively, in which an SPD film and a barrier layer having both predetermined adhesiveness and moisture permeability are arranged in the following positional relationship between the pair of intermediate bonding layers. Here, the predetermined adhesiveness and moisture permeability are the following adhesiveness (A) and moisture permeability (B) respectively.

The adhesiveness (A): an adhesive strength to the glass plate is 40 N/25 mm or more, which is measured in conformity with JIS K 6864-2: 1999 under conditions of an adhesion temperature of 110° C., a test piece width of 25 mm, a testing rate of 300 mm per minute, and a peel angle of 180 degrees.

The moisture permeability (B): a degree of moisture permeability at a temperature of 40° C. and a humidity of 90% RH measured in conformity with JIS Z 0208: 1976 is 50 g/m$^2$·day or less.

In the laminated glass of the present invention, the SPD film is arranged between the pair of intermediate bonding layers. A region where the SPD film is arranged is a predetermined region in a region corresponding to a region except at least a part of band-shaped regions of peripheral edge portions of a main surface of the glass plate. The barrier layer is arranged between the pair of intermediate bonding layers in a manner to correspond to the band-shaped regions.

In the description, the peripheral edge portion of the main surface of the glass plate means a region having a certain width from the outer periphery of the main surface toward the central portion. Further, in the description, the outer periphery side viewed from the central portion of the main surface of the glass plate is referred to as an outside, and the central portion side viewed from the outer periphery is referred to as an inside.

The band-shaped regions where the barrier layer is arranged may be at least a part or all of the peripheral edge portions of the region corresponding to the main surface of the glass plate as needed. For example, in a usage in which there is a particular concern about intrusion of moisture from a certain direction or the like, the barrier layer in a band shape only needs to be provided only at the peripheral edge portion corresponding to the direction. In this case, the SPD film is arranged in a predetermined region in a region except the band-shaped regions where the barrier layer is arranged of the region corresponding to the main surface of the glass plate.

The arrangement region of the SPD film may be the whole or a part of the region except the band-shaped regions where the barrier layer is arranged of the region corresponding to the main surface of the glass plate. When the arrangement region of the SPD film is a part of the region except the band-shaped regions where the barrier layer is arranged of the region corresponding to the main surface of the glass plate, for example, a layer made of the same material as that of a later-described intermediate bonding layer is provided in the remaining region. Incidentally, the SPD film is preferably arranged to make the end face on the outside of the SPD film come into contact with the end face on the inside of the barrier layer. The arrangement region of the SPD film is preferred to be the whole of the region except the band-shaped regions where the barrier layer is arranged of the region corresponding to the main surface of the glass plate. That is, a layer having a planar shape corresponding to the shape of the main surface of the glass plate is formed by the SPD film and the barrier layer between the pair of intermediate bonding layers preferably.

Incidentally, from the viewpoint of more surely protecting the SPD film, the barrier layer is preferably arranged in a band shape at all of the peripheral edge portions of the region corresponding to the main surface of the glass plate. That is, the planar shape of the barrier layer is preferred to be a frame shape that its outer periphery is substantially coincident with the outer periphery of the main surface of the glass plate. In this case, the SPD film is preferably arranged so that its outer periphery substantially coincides with the inner periphery of the barrier layer and the entire end face on the outside (hereinafter, referred to also as an "outer peripheral surface") of the SPD film comes into contact with the entire end face on the inside (hereinafter, referred to also as an "inner peripheral surface") of the barrier layer.

In the laminated glass of the present invention, the SPD film and the barrier layer having predetermined performances, namely the adhesiveness (A) and the moisture permeability (B) are arranged as described above, thereby making it possible to suppress occurrence of poor appearance due to bubbles to remain near the interface between the SPD film and the barrier layer, and intrusion of moisture or the like from the outside is sufficiently suppressed while maintaining transparency of the barrier layer, thereby making it possible to suppress deterioration, in particular, at the end portion of the SPD film.

Figure 1:
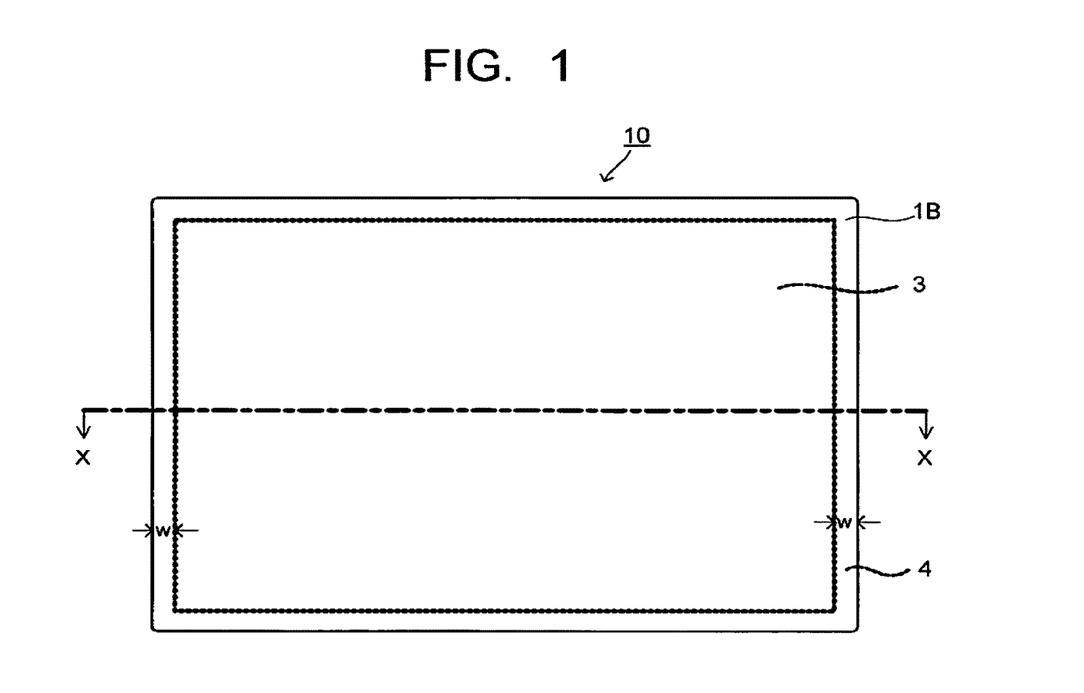
FIG. 1 is a front view of one example of an embodiment of a laminated glass of the present invention.

Hereinafter, embodiments of the laminated glass of the present invention will be explained referring to the drawings. FIG. 1 is a front view of one example of the embodiment of the laminated glass of the present invention, and FIG. 2 is a cross-sectional view taken along a line X-X of the laminated glass illustrated in FIG. 1.

Figure 2:
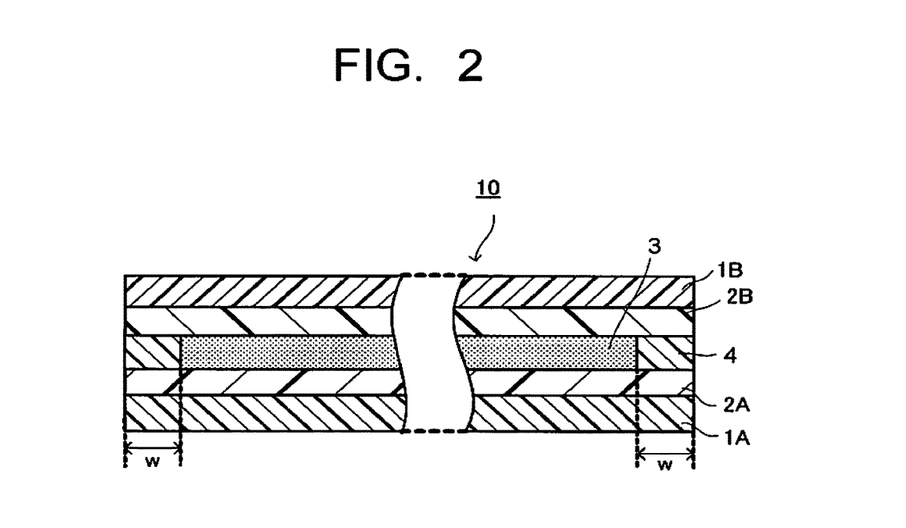
FIG. 2 is a cross-sectional view taken along a line X-X of the laminated glass illustrated in FIG. 1.

Laminated glass 10 illustrated in FIG. 1 and FIG. 2 includes a pair of glass plates 1A, 1B opposing each other, and a pair of intermediate bonding layers 2A, 2B in contact with opposing surfaces of the pair of glass plates 1A, 1B respectively. In the laminated glass 10, the pair of glass plates 1A, 1B and the pair of intermediate bonding layers 2A, 2B have main surfaces with substantially the same shape and same dimensions.

The laminated glass 10 further includes, between the pair of intermediate bonding layers 2A, 2B, an SPD film 3 having a main surface having an area smaller than those of the main surfaces of the glass plates 1A, 1B and having an outer periphery of the main surface located on an inner side of the outer peripheries of the main surfaces of the glass plates 1A, 1B, and includes a barrier layer 4 arranged so that its inner peripheral surface comes into contact with an outer peripheral surface of the SPD film 3 and having a main surface shape in a frame shape having an outer periphery substantially coincident with the outer peripheries of the main surfaces of the glass plates 1A, 1B.

Though not illustrated in FIG. 1 and FIG. 2, the laminated glass 10 includes a wiring conductor for connecting a transparent electrode included in the SPD film 3 and an external power supply. When the laminated glass 10 is used incorporated in a window frame or the like, the laminated glass 10 is connected to the external power supply using the wiring conductor and thereby functions as glass (smart glass) that can electrically switch the transmittance of light by change of the SPD film 3 due to on/off of a power supply switch.

Here, in the description, "substantially the same shape, same dimensions" means having the same shape and same dimensions visually. Also in other cases, "substantially"

means the same meaning as the above. Hereinafter, there will be explained components constituting the laminated glass 10.

[Glass Plate]

Examples of the material of the glass plates 1A, 1B used for the laminated glass 10 according to the embodiment of the present invention include transparent inorganic glass and organic glass (resin). As the inorganic glass, ordinary soda lime glass (referred to also as soda lime silicate glass), borosilicate glass, non-alkali glass, quartz glass and the like are used without any particular limitation. Among them, the soda lime glass is particularly preferred. Its forming method is also not particularly limited and, for example, float plate glass formed by a float process or the like is preferred.

Examples of the organic glass (resin) include a polycarbonate resin, a polystyrene resin, an aromatic polyester resin, an acrylic resin, a polyester resin, a polyarylate resin, a polycondensate of halogenated bisphenol A and ethylene glycol, an acrylic urethane resin, a halogenated aryl group-containing acrylic resin, and so on. Among them, the polycarbonate resin such as an aromatic polycarbonate resin and the acrylic resin such as a polymethyl methacrylate-based acrylic resin are preferred, and the polycarbonate resin is more preferred. Further, among polycarbonate resins, a bisphenol A-based polycarbonate resin is particularly preferred. Incidentally, the glass plate may be composed containing two or more kinds of the above resins.

As the above glass, a colorless and transparent material with no coloring component added thereto may be used, or a colored and transparent material colored within the range not impairing the effect of the present invention may be used. Moreover, one kind of glass may be used or two or more kinds of glass may be used in combination, and for example, a laminated substrate may be made by laminating two or more layers. Though depending on the application place of the laminated glass, the inorganic glass is preferred as glass.

Though the pair of glass plates 1A, 1B used for the laminated glass 10 may be made of different kinds of materials from each other but are preferably made of the same kind of material. A shape of the glass plates 1A, 1B may be flat or may have entirely or partially a curvature. A thickness of the glass plates 1A, 1B can be appropriately selected according to the application place of the laminated glass 10, and is generally preferred to be 0.2 to 5 mm. Further, the glass plates 1A, 1B may have a coating that imparts a water repellent function, a hydrophilic function, an antifogging function, and the like to an exposed surface exposed to the atmosphere. Further, the opposing surfaces opposing each other of the glass plates 1A, 1B may have functional coatings such as a low-radioactive coating, an infrared cut coating, and a conductive coating.

Incidentally, in the case where the opposing surfaces of the glass plates 1A, 1B have the above-described functional coatings, the following intermediate bonding layers 2A, 2B are configured to be in contact with the functional coatings on the opposing surfaces of the glass plates 1A, 1B.

[Intermediate Bonding Layer]

The pair of intermediate bonding layers 2A, 2B in the laminated glass 10 are flat membrane-like layers having main surfaces with substantially the same shape and same dimensions as those of the main surfaces of the glass plates 1A, 1B and having a thickness as described below. The intermediate bonding layers 2A, 2B are provided to be in contact with the opposing surfaces of the glass plates 1A, 1B respectively while holding the SPD film 3 and the barrier layer 4 sandwiched therebetween. As described above, the intermediate bonding layers 2A, 2B have a function of bonding the SPD film 3 and the barrier layer 4 in a manner to hold them sandwiched between the pair of glass plates 1A, 1B via the intermediate bonding layers 2A, 2B to integrate them as the laminated glass 10.

As a constituent material of the intermediate bonding layers 2A, 2B, the same material constituting a conventionally-known intermediate bonding layer generally used for laminated glass can be used without any particular limitation. Concrete examples of the intermediate bonding layers 2A, 2B include ones made by forming compositions containing the following thermoplastic resins as a main component into sheets having main surfaces with substantially the same shape and same dimensions as those of the main surfaces of the glass plates 1A, 1B.

The thermoplastic resin is not particularly limited as long as it can be integrated when a composition containing it as a main component is formed into sheets and used as the pair of intermediate bonding layers 2A, 2B to hold the SPD film 3 and the barrier layer 4 sandwiched therebetween, then inserted in between the pair of glass plates 1A, 1B, and heated and pressurized to form the laminated glass 10. Further, a thermoplastic resin having a visible light transmittance allowing the electrical switching of the transmittance of light by the SPD film to be sufficiently visible when it is formed into laminated glass is preferred, and a thermoplastic resin capable of achieving a visible light transmittance of 30% or more as laminated glass in a visible light transmitting state in which voltage is applied to the SPD film is particularly preferred.

Concrete examples of the thermoplastic resin include thermoplastic resins that are conventionally used as intermediate bonding layers, such as a polyvinyl acetal resin such as a polyvinyl butyral resin (PVB), a polyvinyl chloride resin, a saturated polyester resin, a polyurethane resin, an ethylene-vinyl acetate copolymer resin (EVA), and an ethylene-ethyl acrylate copolymer resin. These thermoplastic resins may be used independently or two or more kinds of them may be used in combination.

The thermoplastic resin for the intermediate bonding layer of the laminated glass is selected according to usage and in consideration of balance among various properties such as transparency, weather resistance, strength, adhesive strength, permeable resistance, impact energy absorbency, moisture resistance, heat insulating property, and sound insulating property. From the above viewpoint, PVB, EVA, and so on are preferred among the above-described thermoplastic resins.

For the intermediate bonding layer, a material that does not affect the function of the SPD film when manufactured and used is preferred. Therefore, a material that does not contain a plasticizer in a thermoplastic resin, or a material containing a plasticizer that does not affect the SPD film is preferred.

For at least one of the intermediate bonding layers 2A, 2B, one having a predetermined adhesive strength and predetermined moisture permeability is preferably used. The predetermined adhesive strength is, for example, the above-described adhesiveness (A): (the adhesive strength to the glass plate is 40 N/25 mm or more, which is measured in conformity with JIS K 6864-2: 1999 under conditions of an adhesion temperature of 110° C., a test piece width of 25 mm, a testing rate of 300 mm per minute, and a peel angle of 180 degrees). The adhesive strength is, as the adhesive strength measured similarly to the adhesiveness (A), more preferred to be 60 N/25 mm or more and further preferred to be 80 N/25 mm or more.

As long as the intermediate bonding layer 2A or 2B has a predetermined adhesive strength or more, deterioration of the SPD film due to moisture can be suppressed. This is conceivably because it is possible to suppress intrusion of moisture from, for example, the interface between the glass plate and the intermediate bonding layer when the adhesive strength of the intermediate bonding layer has a predetermined value. Both the intermediate bonding layers 2A and 2B more preferably have a predetermined adhesive strength or more.

Further, the predetermined moisture permeability is, for example, the above-described moisture permeability (B): (the degree of moisture permeability at a temperature of 40° C. and a humidity of 90% RH measured in conformity with JIS Z 0208: 1976 is 50 g/m²·day or less). The moisture permeability is, as the moisture permeability measured similarly to the moisture permeability (B), more preferred to be 30 g/m²·day or less, further preferred to be 15 g/m²·day or less, and further preferred to be 10 g/m²·day or less. The intermediate bonding layer 2A or 2B has both the above-described predetermined adhesive strength and the predetermined low moisture permeability, thereby enabling significant suppression of deterioration of the SPD film due to moisture. The intermediate bonding layers 2A and 2B both more preferably have both the predetermined adhesive strength and the predetermined low moisture permeability.

Incidentally, a later-described adhesive resin composition (I) can also be formed into sheet films similarly to the above to be used as the intermediate bonding layers. An intermediate bonding layer obtained by using the adhesive resin composition (I) is particularly preferred because its adhesiveness to the glass plate is good and its moisture permeability is low. Further, this intermediate bonding layer is excellent also in balance among various properties such as transparency, weather resistance, strength, permeable resistance, impact energy absorbency, heat insulating property, and sound insulating property.

Further, a heating temperature when forming the laminated glass is set according to the thermoplastic resin for the intermediate bonding layer, but if the heating temperature is higher than the heatproof temperature of the SPD film, the SPD film does not sufficiently function in some cases when it is made into the laminated glass. From this point, it is preferred to select the thermoplastic resin for the intermediate bonding layer so that the laminated glass forming temperature becomes equal to or lower than the heat proof temperature of the SPD film, and in terms also of this point, the adhesive resin composition (I) is preferred because it is plasticized at a relatively low temperature.

As described above, for fabrication of the intermediate bonding layers 2A, 2B, a thermoplastic resin-containing composition containing the above-described thermoplastic resin as a main component is used, and the adhesive resin composition (1) is preferably used. The thermoplastic resin-containing composition may contain one kind or two or more kinds of various additives such as, for example, an infrared absorbent, an ultraviolet absorbent, a fluorescer, an adhesion regulator, a coupling agent, a surface-active agent, an antioxidant, a heat stabilizer, a light stabilizer, a dehydrating agent, a defoaming agent, an antistatic agent, and a flame retarder within the range not impairing the effect of the present invention and according to various purposes. These additives are entirely uniformly contained in the intermediate bonding layers 2A, 2B.

The film thickness of the intermediate bonding layers 2A, 2B is not particularly limited. Concretely, the film thickness of one layer is preferred to be 0.05 to 0.8 mm and the total film thickness of two layers is preferred to be 0.1 to 1.6 mm, similarly to the intermediate bonding layers generally used for the laminated glass and the like. If the film thickness of one layer of the intermediate bonding layers is less than 0.05 mm or the total film thickness of two layers is less than 0.1 mm, strength sometimes becomes insufficient, and if there is a large glass mismatch, peeling becomes more likely to occur. Conversely, when the film thickness of one layer of the intermediate bonding layers is greater than 0.8 mm or the total film thickness of two layers is greater than 1.6 mm, a phenomenon that displacement of the pair of glass plates 1A, 1B between which the intermediate bonding layers 2A, 2B are sandwiched occurs in a later-described compression bonding process when fabricating the laminated glass 10 and in an endurance test (outdoor exposure test, high-temperature test and the like), what is called a plate displacement phenomenon may occur.

Each of the intermediate bonding layers 2A, 2B is not limited to a single-layer structure. For example, a multilayer resin film disclosed in JP-A 2000-272936, which is used for the purpose of improving sound insulating performance and in which resin films different in properties (different in loss tangent) are laminated, may be used as the intermediate bonding layers 2A, 2B. Also in this case, the intermediate bonding layers 2A, 2B do not need to be the same, but a single-layer structure or a multilayer structure can be selected independently for each of them.

[SPD Film]

The SPD film 3 has a main surface having an area smaller than and substantially the similar shape as those of the main surfaces of the glass plates 1A, 1B and is arranged between the intermediate bonding layers 2A, 2B so that the outer periphery of the main surface is located on the inner side of the outer peripheries of the main surfaces of the glass plates 1A, 1B. In the laminated glass 10, a member made by combining the SPD film 3 and the barrier layer 4 that is arranged so that its inner peripheral surface comes into contact with the outer peripheral surface of the SPD film 3 and has a main surface shape in a frame shape, is configured to have a main surface having substantially the same shape and same dimensions as those of the main surfaces of the glass plates 1A, 1B.

In the laminated glass 10 illustrated in FIG. 1, FIG. 2, the main surfaces of the glass plates 1A, 1B are rectangular. The main surface shape of the SPD film 3 is a shape made by cutting all of peripheral edge portions at four sides into band shapes with respect to the main surface shapes of the glass plates 1A, 1B, such that a shape of cutout portion is a frame shape, and the barrier layer 4 is provided in a manner to compensate for the cutout portion. As necessary, the main surface shape of the SPD film 3 may be a shape made by cutting a part of the peripheral edge portions, for example, only a peripheral edge portion at any one side of the four sides into a band shape with respect to the main surface shapes of the glass plates 1A, 1B, a shape made by cutting peripheral edge portions at any two sides, or a shape made by cutting peripheral edge portions at any three sides. Also in this case, the barrier layer 4 only needs to be arranged according to the cutout shape of the SPD film 3 in a manner to compensate for the cutout portion.

A width of the cutout portion of the SPD film 3, namely, a width w of the barrier layer 4 can be appropriately selected according to the usage. In the laminated glass of the present invention, the intermediate bonding layers and the barrier layer are configured to be able to efficiently suppress intrusion of moisture from the end face of the laminated glass as explained below, and therefore the width of the cutout portion of the SPD film 3, namely, the width w of the barrier layer 4 may be 10 mm or less.

As the SPD film, an ordinary SPD film is usable that is configured to hold a polymer layer containing suspended particles that can be oriented by application of voltage thereto between two electrically insulating films having insides coated with transparent conducting films. Such an SPD film is brought into a high transparency state with a high visible light transmittance by turning on the power supply switch to apply voltage between the transparent conducting films to thereby orient the suspended particles in the polymer layer. When the power supply switch is off, the suspended particles in the polymer layer are not oriented, so that the SPD film is brought into a low transparency state with a low visible light transmittance.

Incidentally, the main surface of the SPD film is composed of a main surface of the electrically insulating film such as the resin as described above on which the transparent conducting film and the polymer layer containing the suspended particles are not exposed, but is configured that they are exposed at the end face of the SPD film. Accordingly, protecting the end face with the barrier layer makes it possible to effectively suppress occurrence of failure in switching the visible light transmittance in response to on/off of the power supply switch at the peripheral edge portion of the SPD film.

As the SPD film, for example, a commercial product such as LCF-1103DHA (product name, manufactured by Hitachi Chemical Co., Ltd.) or the like can be used. Incidentally, such a commercial product is supplied in a predetermined size and therefore is cut, when used, into a desired size according to the size of the laminated glass. Incidentally, a thickness of the SPD film used for the laminated glass 10 is not particularly limited, but is preferably 0.2 to 0.4 mm from the viewpoint of handling property and easy availability.

[Barrier Layer]

In the laminated glass 10, the barrier layer 4 has the adhesiveness (A) and the moisture permeability (B) and is arranged between the intermediate bonding layers 2A, 2B in a form surrounding the SPD film 3 so that the inner peripheral surface of the barrier layer 4 comes into contact with the outer peripheral surface of the SPD film 3 for the purpose of protecting the entire end face of the SPD film 3. Here, the adhesiveness (A) and the moisture permeability (B) are as described above. Incidentally, regarding the preferable ranges of the adhesiveness and the moisture permeability, the adhesiveness is, as the adhesive strength measured similarly to the adhesiveness (A), preferably 60 N/25 mm or more and more preferably 80 N/25 mm or more. The moisture permeability is, as the moisture permeability measured similarly to the moisture permeability (B), preferably 30 g/m$^2$·day or less, more preferably 15 g/m$^2$·day or less, and further preferably 10 g/m$^2$·day or less.

As described above, the barrier layer 4 is arranged according to the shape of the cut portion that the main surface of the SPD film 3 has with respect to the main surface shapes of the glass plates 1A, 1B in a manner to compensate for the cutout portion. The width w of the barrier layer 4 is appropriately selected according to the usage. In the laminated glass 10, even if the width w of the barrier layer 4 is 10 mm or less, it is possible to maintain the property of sufficiently suppressing intrusion of moisture from the end face of the laminated glass 10 to protect the end face of the SPD film 3 from moisture (hereinafter, referred to as "moisture-proof property"). Thereby, use of the laminated glass according to this embodiment makes it possible to apply the laminated glass including the SPD film to a usage in which higher design property is required.

The lower limit of the width of the barrier layer capable of maintaining the moisture-proof property in the laminated glass of the present invention can be set to almost 3 mm though depending on the thickness and the composing material of the barrier layer. Incidentally, in the case where higher moisture-proof property is required, the lower limit of the width of the barrier layer is preferably about 5 mm.

In the barrier layer 4 having a main surface shape in a frame shape having the outer periphery substantially coincident with the outer peripheries of the main surfaces of the glass plates 1A, 1B, which is included in the laminated glass 10 having a rectangular main surface shape, the width w may be the same or different for each side of the frame portion along the four sides of the rectangle, or may be partially large or small regardless of the sides, as long as the width w is equal to or larger than the lower limit.

Further, from the viewpoint of sufficiently protecting the end face of the SPD film 3, a thickness of the barrier layer 4 is preferred to be substantially the same as that of the SPD film 3. Concretely, the thickness of the barrier layer 4 is preferably within ±0.1 mm of the thickness of the SPD film 3, and more preferably within ±0.075 mm.

The barrier layer 4 is preferred to be the later-described adhesive resin composition (I), an ethylene-vinyl acetate copolymer resin composition as described in U.S. Pat. No. 5,625,781, characterized in that organized layered clay, a silane coupling agent, and the like are contained in an ethylene-vinyl acetate copolymer, or the like. Containing the organized layered clay makes it possible to significantly reduce the moisture permeability as compared to an ordinary ethylene-vinyl acetate copolymer resin composition.

[Adhesive Resin Composition (I)]

The adhesive resin composition (I) contains a modified block copolymer hydride [3]. The modified block copolymer hydride [3] is obtained by alkoxysilylating a block copolymer hydride [2] obtained by hydrogenating carbon-carbon unsaturated bonds of a specific block copolymer [1] to be explained below.

(Block Copolymer [1])

The block copolymer [1] contains at least two polymer blocks [A] and at least one polymer block [B].

The polymer block [A] contains a structural unit derived from an aromatic vinyl compound as a main component. The content of the structural unit derived from the aromatic vinyl compound in the polymer block [A] is normally 90 mass % or more, preferably 95 mass % or more, and more preferably 99 mass % or more. The polymer block [A] can contain, as components other than the structural unit derived from the aromatic vinyl compound, a structural unit derived from chain conjugated diene and/or a structural unit derived from another vinyl compound, and its content is normally 10 mass % or less, preferably 5 mass % or less, and more preferably 1 mass % or less. When the structural unit derived from the aromatic vinyl compound in the polymer block [A] is too small, heat resistance of the barrier layer is not sufficient in some cases. A plurality of the polymer blocks [A] may be the same with or different from each other as long as they satisfy the above-described range.

The polymer block [B] contains a structural unit derived from a chain conjugated diene compound as a main component. The content of the structural unit derived from the chain conjugated diene compound in the polymer block [B] is normally 90 mass % or more, preferably 95 mass % or more, and more preferably 99 mass % or more. As long as the structural unit derived from the chain conjugated diene compound in the polymer block [B] falls within the above-described range, the barrier layer is excellent in flexibility and adhesiveness at low temperature. The polymer block [B] can contain, as components other than the structural unit derived from the chain conjugated diene compound, a structural unit derived from an aromatic vinyl compound and/or a structural unit derived from another vinyl compound, and its content is normally 10 mass % or less, preferably 5 mass % or less, and more preferably 1 mass % or less. When the content of the structural unit derived from the aromatic vinyl compound in the polymer block [B] increases, the flexibility at low temperature of the barrier layer reduces, resulting in that impact resistance of the obtained laminated glass may reduce. When a plurality of the polymer blocks [B] are contained, the polymer blocks [B] may be the same with or different from each other as long as they satisfy the above-described range.

Concrete examples of the aromatic vinyl compound include styrene, α-methylstyrene, 2-methylstyrene, 3-methylstyrene, 4-methylstyrene, 2,4-diisopropyl styrene, 2,4-dimethylstyrene, 4-t-butyl styrene, 5-t-butyl-2-methylstyrene, 4-monochlorostyrene, dichlorostyrene, 4-monofluorostyrene, 4-phenylstyrene, and so on, and in the aspect of moisture permeability, one not containing a polar group is preferred and the styrene is particularly preferred due to industrial easy availability.

Concrete examples of a chain conjugated diene-based compound include 1,3-butadiene, isoprene, 2,3-dimethyl-1, 3-butadiene, 1,3-pentadiene, and so on, and in the aspect of moisture permeability, one not containing a polar group is preferred and the 1,3-butadiene and the isoprene are particular preferred due to industrial easy availability.

As the another vinyl-based compound, a chain vinyl compound and a cyclic vinyl compound can be cited. As the another vinyl-based compound, a vinyl compound having a nitrile group, an alkoxycarbonyl group, a hydroxycarbonyl group, or a halogen group, an unsaturated cyclic anhydride or an unsaturated imide compound may be contained. As the another vinyl-based compound, concretely, ones not containing a polar group, which are chain olefin such as ethylene, propylene, 1-butene, 1-pentene, 1-hexene, 1-heptene, 1-octene, 1-nonene, 1-decene, 1-dodecene, 1-eicosene, 4-methyl-1-pentene, or 4,6-dimethyl-1-heptene; cyclic olefin such as vinylcyclohexane, and so on, are preferred in the aspect of moisture permeability. As the another vinyl-based compound among them, the chain olefin is more preferred, and the ethylene and the propylene are particular preferred.

The number of polymer blocks [A] in the block copolymer [1] is normally five or less, preferably four or less, and more preferably three or less. When there exist a plurality of the polymer blocks [A] and/or a plurality of the polymer blocks [B], among the polymer blocks [A], the maximum weight-average molecular weight of the polymer block is set to Mw(A1) and the minimum weight-average molecular weight of the polymer block is set to Mw(A2) respectively and among the polymer blocks [B], the maximum weight-average molecular weight of the polymer block is set to Mw(B1) and the minimum weight-average molecular weight of the polymer block is set to Mw(B2) respectively, and then a ratio of Mw(A1) to Mw(A2) (Mw(A1)/Mw(A2)) and a ratio of Mw(B1) to Mw(B2) (Mw(B1)/Mw(B2)) are each normally 2.0 or less, preferably 1.5 or less, and more preferably 1.2 or less.

The type of block of the block copolymer [1] may be a chain-type block or a radial-type block, and the chain-type block is preferred because it is excellent in mechanical strength. The most preferred configuration of the block copolymer [1] is a triblock copolymer in which the polymer blocks [A] are bonded to both ends of the polymer block [B], and a pentablock copolymer in which the polymer blocks [B] are bonded to both ends of the polymer block [A] and the polymer blocks [A] are bonded to the other ends of the both polymer blocks [B] respectively.

A ratio of wA to wB (wA:wB) is 30:70 to 60:40 when a mass fraction of the all polymer blocks [A] in the block copolymer [1] to the block copolymer [1] is set to wA and a mass fraction of the all polymer blocks [B] to the entire block copolymer [1] is set to wB. wA:wB is preferably 35:65 to 55:45, and more preferably 40:60 to 50:50. When wA is too high, heat resistance of the modified block copolymer hydride [3] increases, but the flexibility becomes likely to reduce. When wA is too low, a refractive index becomes too small as compared to a refractive index of float glass. Therefore, the total reflection becomes likely to occur at the interface between the barrier layer and another layer to reduce visibility, and thus it is not preferred.

A molecular weight of the block copolymer [1] is normally 30,000 to 200,000, preferably 40,000 to 150,000, and more preferably 50,000 to 100,000 in a polystyrene-equivalent weight-average molecular weight (Mw) measured by gel permeation chromatography (GPC) using tetrahydrofuran as a solvent. Further, a molecular-weight distribution of the block copolymer [1] (Mw/Mn) is preferably 3 or less, more preferably 2 or less, and particularly preferably 1.5 or less.

Examples of a method of producing the block copolymer [1] include: a method of alternately polymerizing a monomer mixture (a) containing an aromatic vinyl compound as a main component, and a monomer mixture (b) containing a chain conjugated diene-based compound as a main component by a method such as living anionic polymerization; a method of sequentially polymerizing a monomer mixture (a) containing an aromatic vinyl compound as a main component, and a monomer mixture (b) containing a chain conjugated diene-based compound as a main component; and then coupling the ends of the polymer block [A] and the polymer block [B] with a coupling agent; and so on.

(Block Copolymer Hydride [2])

The block copolymer hydride [2] is that 90% or more of all unsaturated bonds contained in the above-described block copolymer [1] are hydrogenated. The all unsaturated bonds contained in the block copolymer [1] indicate the total of carbon-carbon unsaturated bonds at its main chain and its side chains and carbon-carbon unsaturated bonds of an aromatic ring. The above-described hydrogenation rate is preferably 97% or more, and more preferably 99% or more. As the hydrogenation rate is higher, the weather resistance and the heat resistance of the barrier layer are better. The hydrogenation rate of the block copolymer hydride [2] can be obtained by measurement by means of 1H-NMR.

A method, a reaction form, and the like for hydrogenation of the unsaturated bond are not limited in particular, and the hydrogenation may be performed in accordance with a publicly-known method, and a hydrogenation method capable of increasing the hydrogenation rate and causing less polymer-chain cleavage reaction is preferred. As such a hydrogenation method, the methods described in, for example, International Publication No. WO2011/096389, International Publication WO2012/043708, and so on can be cited.

The block copolymer hydride [2] obtained by the above-described method is separated from the reaction solution, after a hydrogenation catalyst and/or a polymerization catalyst are/is removed from a reaction solution containing the block copolymer hydride [2]. The form of the separated block copolymer hydride [2] is not limited, but the block copolymer hydride [2] is normally formed into a form of pellets, and can be subjected to the following introduction reaction of an alkoxysilyl group.

A molecular weight of the block copolymer hydride [2] is normally 35,000 to 200,000, preferably 40,000 to 150,000, and more preferably 45,000 to 100,000 in the polystyrene-equivalent weight-average molecular weight (Mw) measured by GPC using tetrahydrofuran as a solvent. Further, the molecular-weight distribution (Mw/Mn) of the block copolymer hydride [2] is preferably set to 3 or less, more preferably set to 2 or less, and particularly preferably set to 1.5 or less. When Mw and Mw/Mn are made to fall within the above-described ranges, the mechanical strength and the heat resistance of the barrier layer improve.

(Modified Block Copolymer Hydride [3])

The modified block copolymer hydride [3] is that an alkoxysilyl group is introduced into the above-described block copolymer hydride [2]. The alkoxysilyl group may be directly bonded to the above-described block copolymer hydride [2], or may also be bonded to the above-described block copolymer hydride [2] via a bivalent organic group such as an alkylene group.

As a method of introducing the alkoxysilyl group, normally, a method of making the above-described block copolymer hydride [2] react with an ethylenically unsaturated silane compound in the presence of peroxide is preferred.

An introduction amount of the alkoxysilyl group is normally 0.1 to 10 parts by mass, preferably 0.2 to 5 parts by mass, and more preferably 0.3 to 3 parts by mass to 100 parts by mass of the block copolymer hydride [2]. When the introduction amount of the alkoxysilyl group is too large, crosslinking between alkoxysilyl groups decomposed due to a slight amount of moisture or the like progresses before the modified block copolymer hydride [3] is melted and formed into a desired shape, resulting in that problems such that gel occurs and fluidity when melted reduces and thereby formability deteriorates occur. When the introduction amount of the alkoxysilyl group is too small, a failure that a sufficient adhesive strength to another layer cannot be obtained occurs, and thus it is not preferred. The introduction of the alkoxysilyl group can be confirmed by an IR spectrum, and the introduction amount can be obtained by measurement by means of 1H-NMR.

The ethylenically unsaturated silane compound is not limited in particular as long as it enables graft polymerization with the above-described block copolymer hydride [2] to introduce the alkoxysilyl group into the block copolymer hydride [2], and, for example, vinyltrimethoxysilane, vinyltriethoxysilane, allyltrimethoxysilane, allyltriethoxysilane, dimethoxymethylvinylsilane, diethoxymethylvinylsilane, and p-styryltrimethoxysilane are suitably used. These ethylenically unsaturated silane compounds may be used independently or two or more kinds of them may be used in combination. A use amount of the ethylenically unsaturated silane compound can be the same as the above-described introduction amount of the alkoxysilyl group.

As the peroxide, one with a one-minute half-life temperature of 170 to 190° C. is preferably used. As the peroxide, for example, t-butylcumyl peroxide, dicumyl peroxide, di-t-hexyl peroxide, 2,5-dimethyl-2,5-di(t-butylperoxy)hexane, di-t-butyl peroxide, and so on are suitably used.

These peroxides may be used independently or two or more kinds of them may be used in combination. A use amount of the peroxide is normally 0.05 to 2 parts by mass, preferably 0.1 to 1 parts by mass, and more preferably 0.2 to 0.5 parts by mass to 100 parts by mass of the block copolymer hydride [2].

A method of making the above-described block copolymer hydride [2] react with the ethylenically unsaturated silane compound in the presence of peroxide is not limited in particular. For example, the block copolymer hydride [2], a predetermined amount of the ethylenically unsaturated silane compound, and the peroxide are kneaded in a biaxial kneader at a desired temperature for a desired time period, thereby enabling the introduction of the alkoxysilyl group. The above-described kneading temperature is normally 180 to 220° C., preferably 185 to 210° C., and more preferably 190 to 200° C. The heating and kneading time period is normally 0.1 to 10 minutes, preferably 0.2 to 5 minutes, and more preferably 0.3 to 2 minutes or so. Kneading and extrusion only need to be performed continuously so as to make the temperature and the residence time fall within the above-described ranges.

Although a molecular weight of the modified block copolymer hydride [3] is not substantially different from the molecular weight of the block copolymer hydride [2] that is used as the raw material because the introduction amount of the alkoxysilyl group is small, due to the reaction with the ethylenically unsaturated silane compound in the presence of peroxide, not only crosslinking reaction of polymers, but also cleavage reaction occurs simultaneously, resulting in an increase in the molecular-weight distribution. The polystyrene-equivalent weight-average molecular weight (Mw) measured by GPC using tetrahydrofuran as a solvent is normally 35,000 to 200,000, preferably 40,000 to 150,000, and more preferably 45,000 to 100,000, and the molecular-weight distribution (Mw/Mn) is normally 3.5 or less, preferably 2.5 or less, and particularly preferably 2.0 or less. As long as Mw and Mw/Mn fall within the ranges, the mechanical strength and the heat resistance of the barrier layer are maintained.

The adhesive resin composition (I) contains the modified block copolymer hydride [3]. The adhesive resin composition (I) may contain other components other than the modified block copolymer hydride [3].

As other components, a plasticizer for improving adhesiveness and/or sound insulating performance, a light stabilizer, an ultraviolet absorbent, an antioxidant, and so on for improving light resistance, light blocking property, heat resistance, and so on can be cited.

The laminated glass of the present invention has been explained above by taking the laminated glass 10 illustrated in FIGS. 1, 2 as an example, but the present invention is not limited to this. The design can be changed or modified in a range without departing from the scope and the range of the present invention. The laminated glass according to the embodiment may have a configuration having three or more glass plates as necessary in which, for example, one or more glass plates are laminated on the atmosphere side of the glass plate 1A or the glass plate 1B of the laminated glass 10 each via an intermediate bonding layer prepared separately from the intermediate bonding layers 2A, 2B. Further, the laminated glass according to the embodiment may optionally have another layer within the range not impairing the effect of the present invention, in addition to the above-described components.

(Another Layer)

The laminated glass according to the embodiment may have, as another layer, another functional film other than the SPD film between the pair of glass plates. When the laminated glass has the another functional film, for example, the laminated glass further has an intermediate bonding layer in addition to the above-described pair of intermediate bonding layers and is made by sequentially laminating the glass plate, the intermediate bonding layer, the another functional film, the intermediate bonding layer, the layer made by combining the SPD film and the barrier layer, the intermediate bonding layer, and the glass plate.

Examples of another functional film include an infrared cut film and the like. As the infrared cut film, concretely, the one in which a conventionally-known infrared reflective film on a supporting film such as an infrared reflective film having a thickness of about 100 to 500 nm and consisting of a dielectric multilayer film, a liquid crystal alignment film, an infrared reflector-containing coating film, or a single-layer or multilayer infrared reflective film including a metal layer is formed as an infrared reflective film on a supporting film such as a PET film having a thickness of about 25 to 200 µm or the like, can be exemplified. As the infrared cut film, a dielectric multilayer film made by laminating resin films different in refractive index and having a total film thickness of about 25 to 200 µm and the like can be exemplified.

In the laminated glass, a black ceramic layer is sometimes provided in a band shape at a part or all of the peripheral edge portions of the main surface of the glass plate composing the laminated glass for the purpose of hiding a portion attached to a frame body or the like of the laminated glass, the wiring conductor, and so on and for the purpose of preventing appearance deterioration as a result of deterioration over time of the end portion of the SPD film due to moisture from the outside. Also in the laminated glass according to the embodiment, such a black ceramic layer may be provided as another layer. However, from the aspect of design improvement, when the laminated glass of the present invention does not have the black ceramic layer, or even if having the black ceramic layer, its width is narrow, which is 30 mm or less concretely, the present invention can exhibit the effect maximally.

[Manufacture of Laminated Glass]

The laminated glass according to the embodiment of the present invention can be manufactured by a generally used publicly-known technique. In the laminated glass 10, a laminate in which the SPD film 3 and the barrier layer 4 are arranged to be located in a predetermined positional relationship between the pair of intermediate bonding layers 2A, 2B is fabricated, and the laminate is inserted in between the pair of glass plates 1A, 1B to prepare a laminated glass precursor being laminated glass before compression bonding in which the glass plate 1A, the intermediate bonding layer 2A, the layer composed of the SPD film 3 and the barrier layer 4, the intermediate bonding layer 2B, and the glass plate 1B are laminated in this order. Also in the case of having another layer, glass plates and layers are laminated in the similar lamination order to that of similarly obtained laminated glass to prepare a laminated glass precursor.

This laminated glass precursor is put in a vacuum bag such as a rubber bag, the vacuum bag is connected to an exhaust system, bonding is performed at a temperature of about 70 to 110° C. while performing pressure-reduction suction (deaeration) so that a pressure in the vacuum bag becomes a pressure reduction degree of about −65 to −100 kPa, and thereby the laminated glass according to the embodiment can be obtained. Further, for example, the laminated glass is subjected to compression bonding of heating and pressurizing it under conditions of 100 to 110° C. and a pressure of 0.6 to 1.3 MPa, and thereby laminated glass superior in durability can be obtained.

The laminated glass of the present invention is laminated glass excellent in property of switching transmittance of light for a long term by suppressing deterioration over time of the SPD film, in particular, deterioration due to intrusion of moisture at the end portion, and is suitably used for window glass for vehicle, for example.

EXAMPLES

Hereinafter, the present invention will be explained in more detail using examples. The present invention is not limited to embodiments and examples explained below.

Experimental Example 1

An evaluation sample having PVB whose moisture content was measurable was fabricated in place of the SPD film as described below, and the moisture-proof property of the barrier layer applied to the laminated glass of the present invention was evaluated.

(Fabrication of Evaluation Sample)

Figure 3:
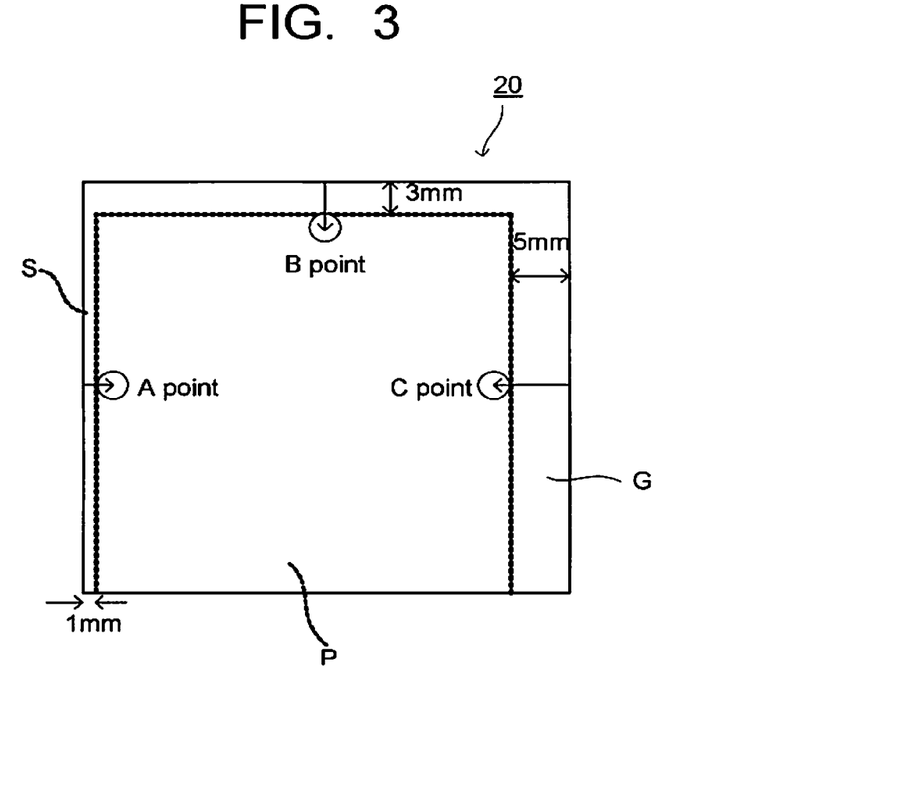
FIG. 3 is a front view of an evaluation sample in EXAMPLES.
Figure 4:
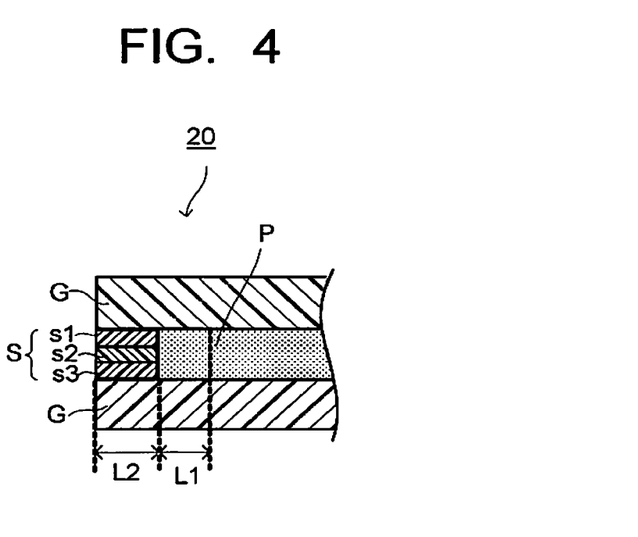
FIG. 4 is a cross-sectional view of an end portion of the evaluation sample in EXAMPLES.

An evaluation sample 20, whose front view is illustrated in FIG. 3 and whose cross-sectional view at an end portion is illustrated in FIG. 4, was fabricated as follows.

Between two glass plates G (2 mm thick, 100 mm squares) made of soda lime glass, a PVB laminated film P in which a 94×97 mm and 0.76 mm thick of PVB film and a PVB film having the same size and a 0.38 mm thickness (manufactured by Eastman Chemical Company, RK11 (product name)) were laminated was arranged so that some opposing two sides were inside by 1 mm and 5 mm from outer periphery ends of the glass plate G respectively and the other opposing two sides were inside by 0 mm and 3 mm from outer periphery ends of the glass plate G respectively. Further, a barrier layer S in a shape to compensate for the cutout portion of the PVB laminated film P between the two glass plates G and having band-shaped regions formed in a shape such that one side is removed from a frame shape (hereinafter referred to as "channel shape") was arranged. Incidentally, the barrier layer S is arranged so that an end face on the inside of the channel shape comes into contact with end faces of three sides of the PVB laminated film P not aligned with one side of the glass plates G and the outside of the channel shape is aligned with the outer periphery of the glass plates G. Incidentally, three sides of the channel shape of the band-shaped regions that the barrier layer S has are 1 mm, 3 mm, and 5 mm in width respectively.

A laminate composed of the glass plates G, the PVB laminated film P, and the barrier layer S, which were obtained in the above, was put in a vacuum bag to be subjected to deaeration and then put into an oven kept at 120° C. and let stand for 30 minutes, and subjected to compression bonding, and thereby the evaluation sample 20 was obtained. Incidentally, two same evaluation samples 20 were obtained in the above.

Incidentally, a laminated structure of the barrier layer S is, as illustrated in FIG. 4, a three-layer laminated structure composed of 0.38 mm thick barrier layer films s1, s2, and s3. Further, the barrier layer films s1, s2, and s3 were all films composed of an adhesive resin composition (Ia) fabricated as follows.

<Fabrication of Adhesive Resin Composition (Ia) Film>

A modified block copolymer hydride [3]-1 produced in the following manner was used to fabricate an adhesive resin composition (Ia) film as follows.

(1) Synthesis of Block Copolymer [1]-1

Into a reactor equipped with a stirring device in which the internal atmosphere was sufficiently replaced with nitrogen, 550 parts (by mass, hereinafter "parts" means parts by mass) of dehydrated cyclohexane, 2.50 parts of dehydrated styrene, and 0.475 parts of n-dibutyl ether were put, and while stirring this mixture at 60° C., 0.62 parts of n-butyllithium (15% cyclohexane solution) was added to the mixture to start polymerization. While stirring, the mixture was made to react at 60° C. for 60 minutes. A polymerization conversion rate at this point, which was measured by gas chromatography, was 99.5%.

Next, 50.0 parts of dehydrated isoprene was added to the mixture, and the mixture was stirred continuously for 30 minutes in this state. The polymerization conversion rate at this point was 99.5%. Thereafter, 25.0 parts of dehydrated styrene was further added to the mixture, and the mixture was stirred for 60 minutes. The polymerization conversion rate at this point was almost 100%. At this time, 0.5 parts of isopropyl alcohol were added to the mixture to stop reaction. An obtained block copolymer [1]-1 had a weight-average molecular weight (Mw) of 78,000, a molecular-weight distribution (Mw/Mn) of 1.03, and wA:wB=50:50.

(2) Synthesis of Block Copolymer Hydride [2]-1

Next, the above-described polymer solution was transferred to a pressure-resistant reactor equipped with a stirring device, and 3.0 parts of diatomaceous earth supported type nickel catalyst (product name "T-8400RL" manufactured by Sud-Chemie) as a hydrogenation catalyst and 100 parts of dehydrated cyclohexane were added to the polymer solution to be mixed. The atmosphere inside the reactor was replaced with hydrogen gas, hydrogen was supplied to the solution while stirring it, to be subjected to a hydrogenation reaction of the solution at a temperature of 190° C. for 6 hours under a pressure of 4.5 MPa. A block copolymer hydride [2]-1 resulting from the hydrogenation reaction had a weight-average molecular weight (Mw) of 78,800 and a molecular-weight distribution (Mw/Mn) of 1.04.

After completion of the hydrogenation reaction, the reaction solution was filtered to remove the hydrogenation catalyst, and then 1.0 part of a xylene solution in which 0.1 parts of pentaerythrityl tetrakis[3-(3,5-di-t-butyl-4-hydroxyphenyl)propionate] (product name "Songnox1010" manufactured by SONGWON) being a phenol-based antioxidant was dissolved was added to the reaction solution to be dissolved.

Next, after filtering the above-described solution through a metal fiber filter (pore size 0.4 μm, manufactured by Nichidai Corporation) to remove minute solids, cyclohexane, xylene, and other volatile components, which are the solvent, were removed from the solution at a temperature of 260° C. under a pressure of 0.001 MPa or less using a cylindrical evaporator (product name "Kontro" manufactured by Hitachi Ltd.). The molten polymer was continuously filtered off at a temperature of 260° C. through a polymer filter (manufactured by Fuji Filter Manufacturing Co., Ltd.) provided with a stainless steel sintered filter having a pore size of 5 μm connected to the evaporator, and then extruded in a strand shape from a die to be cooled, and then fabricated into 96 parts of pellets of the block copolymer hydride [2]-1 using a pelletizer. The obtained block copolymer hydride [2]-1 had a weight-average molecular weight (Mw) of 77,800 and a molecular-weight distribution (Mw/Mn) of 1.04. The hydrogenation rate was almost 100%.

(3) Synthesis of Modified Block Copolymer Hydride [3]-1

To 100 parts of pellets of the obtained block copolymer hydride [2]-1, 2.0 parts of vinyltrimethoxysilane and 0.2 parts of 2,5-dimethyl-2,5-di(t-butylperoxy)hexane (product name "PERHEXA (registered trademark) 25B" manufactured by NOF CORPORATION) were added, and this mixture was kneaded at a resin temperature of 200° C. for a residence time of 60 to 70 seconds using a twin-screw extruder (product name "TEM37B" manufactured by TOSHIBA MACHINE CO., LTD.), and extruded in a strand shape to be air-cooled and then cut, using a pelletizer, to obtain 97 parts of pellets of an alkoxysilyl group-containing modified block copolymer hydride [3]-1.

Ten parts of pellets of the obtained alkoxysilyl group-containing modified block copolymer hydride [3]-1 were dissolved in 100 parts of cyclohexane, and then the dissolved resultant was poured into 400 parts of dehydrated methanol to coagulate the alkoxysilyl group-containing modified block copolymer hydride [3]-1, and the coagulated alkoxysilyl group-containing modified block copolymer hydride [3]-1 was filtered off and dried at 25° C. under vacuum to isolate 9.5 parts of crumbs of the alkoxysilyl group-containing modified block copolymer hydride [3]-1. In the FT-IR spectrum, a new absorption band attributed to an Si—$OCH_3$ group was observed at 1090 $cm^{-1}$ and a new absorption band attributed to an Si—$CH_2$ group was observed at 825 $cm^{-1}$ and 739 $cm^{-1}$, which were positions different from 1075 $cm^{-1}$, 808 $cm^{-1}$, and 766 $cm^{-1}$ of absorption bands of vinyltrimethoxysilane. Further, in the 1H-NMR spectrum (in deuterochloroform), an absorption band based on protons of a methoxy group was observed at 3.6 ppm, and it was confirmed from a peak area ratio that 1.7 parts of vinyltrimethoxysilane were bonded to 100 parts of the block copolymer hydride [2]-1.

(Fabrication of Adhesive Resin Composition (Ia) and Film)

To 100 parts by mass of pellets of the modified block copolymer hydride [3]-1 obtained in the above, 0.5 parts of 2-hydroxy-4-n-octoxybenzophenone (product name "ADK STAB (registered trademark) 1413" manufactured by ADEKA CORPORATION) being an ultraviolet absorbent were added, and this was extruded into a sheet of the adhesive resin composition (Ia) having a 1.2 mm thickness and a 1000 mm width under forming conditions of a molten resin temperature of 190° C., a T-die temperature of 190° C., and a roll temperature of 50° C. by using a T-die type film melt extruder (T-die width: 1200 mm) including an extruder having a screw with a 90 mmφ and using a sheet take-up device provided with an embossing roll having a satin finish pattern. The obtained sheet was wound up. The obtained sheet was formed into a film having a 0.38 mm thickness.

An adhesive strength to glass of the obtained film was measured by the above-described same method as that of the adhesiveness (A) in conformity with JIS K 6854-2:1999, resulting in that it was 67.8 [N/25 mm]. Incidentally, a sample for measuring adhesiveness to a glass plate was fabricated as follows. A glass plate (soda lime glass, 2 mm thick×60×25 mm size), the adhesive resin composition (Ia) film, a 100 μm thick PET film, a 2 mm thick soda lime glass plate (each having a 100×25 mm size) were laminated in this order, and this laminate was put in a vacuum bag. Thereafter, compression bonding was performed at 110° C. while performing deaeration so as to obtain a pressure reduction degree of about −60 kPa or less in the vacuum bag. In the meantime, moisture permeability of the obtained film was measured by the above-described same method as that of the moisture permeability (B) in conformity with JIS Z 0208: 1976, resulting in that it was 1 [$g/m^2$·day].

(Moisture-Proof Property Evaluation)

One of the evaluation samples 20 obtained in the above was put in a thermohygrostat at 80° C. and a humidity of 95% RH for 110 hours, and the other one was put in a thermohygrostat at 50° C. and a humidity of 95% RH for 376 hours. After the sample was taken out of the thermohygrostat and returned to normal temperature, spectroscopic measurement was performed around an A point that was inside by 3.5 mm on a side where the width of the barrier layer was 1 mm, around a B point that was inside by 5.5 mm on a side where the width of the barrier layer was 3 mm, and around a C point that was inside by 7.5 mm on a side where the width of the barrier layer was 5 mm, from the three sides of the glass plate G on the side where the barrier layer S was arranged by means of a Spectrum Two manufactured by PerkinElmer, Inc., to thereby measure the moisture content of the PVB laminated film P at the A point, the B point, and the C point. Values obtained by subtracting an initial moisture content (%) of the PVB laminated film P that was measured beforehand before being put in the thermohygrostat from each of the moisture contents (%) obtained at the respective measurement points were used as moisture content increases (%) for evaluation.

Incidentally, in FIG. 4, L2 indicates the width (1 mm, 3 mm, or 5 mm) of the barrier layer. Further, in FIG. 4, L1 is 2 mm, which indicates that the spectroscopic measurement was performed at a position of 2 mm from the inside of the barrier layer. The measurement results of the moisture content increase (%) are illustrated in Table 1.

Experimental Example 2

An evaluation sample for experiment was fabricated similarly to the evaluation sample 20 for the above-described Experimental example 1 except that in place of the barrier layer S, a three-layer laminated film in which three EVA films (manufactured by TOSO NIKKEMI CORPORATION, Mersen G7055 (product name)) each having a 0.4 mm thickness were laminated was used, and the moisture-proof property evaluation similar to the above was performed. The measurement results are illustrated in Table 1.

Incidentally, the adhesive strength to glass of the EVA film was measured by the same method as that in the above-described Experimental example 1 by fabricating a sample for measuring adhesiveness to a glass plate, resulting in that it was 143.7 [N/25 mm]. On the other hand, the moisture permeability of the obtained film was measured by the same method as that in the above-described Experimental example 1, resulting in that it was 14 [g/m$^2$·day].

Comparative Experimental Example 1

An evaluation sample for comparative experiment was fabricated similarly to the evaluation sample 20 for the above-described Experimental example 1 except that in place of the barrier layer S, a three-layer laminated film in which three EVA films (manufactured by TOSO NIKKEMI CORPORATION, Mersen G7060 (product name)) each having a 0.4 mm thickness were laminated was used, and the moisture-proof property evaluation similar to the above was performed. The measurement results are illustrated in Table 1.

Incidentally, the adhesive strength to glass of the EVA film was measured by the same method as that in the above-described Experimental example 1 by fabricating a sample for measuring adhesiveness to a glass plate, resulting in that it was 74.8 [N/25 mm]. On the other hand, the moisture permeability of the obtained film was measured by the same method as that in the above-described Experimental example 1, resulting in that it was 53 [g/m$^2$·day].

Comparative Experimental Example 2

An evaluation sample for comparative experiment was fabricated similarly to the evaluation sample 20 for the above-described Experimental example 1 except that in place of the barrier layer S, a three-layer laminated film in which three PVB films (manufactured by Eastman Chemical Company, RK11 (product name)) each having a 0.38 mm thickness were laminated was used, and the moisture-proof property evaluation similar to the above was performed. The measurement results are illustrated in Table 1.

Incidentally, the adhesive strength to glass of the PVB film was measured by the same method as that in the above-described Experimental example 1, resulting in that it was 38.7 [N/25 mm]. Incidentally, the sample for measuring adhesiveness to a glass plate was processed in the same manner as in the above-described Experimental example 1 except that under the condition of deaeration being performed so as to obtain a pressure reduction degree of −60 kPa or less in the vacuum bag, pre-compression bonding was performed at a temperature of 110° C. and thereafter main compression bonding was performed at a temperature of 110° C. under a pressure of 1.3 MPa. On the other hand, the moisture permeability of the obtained film was measured by the same method as that in the above-described Experimental example 1, resulting in that it was 110 [g/m$^2$·day].

TABLE 1

| | Moisture content increase [%] | | | | | |
| | 80° C. 95% RH after 110 hours | | | 50° C. 95% RH after 376 hours | | |
| | A point | B point | C point | A point | B point | C point |
|---|---|---|---|---|---|---|
| Experimental example 1 | 0.22% | 0.19% | 0.13% | 0.13% | 0.10% | 0.05% |
| Experimental example 2 | 1.02% | 0.67% | 0.48% | 0.66% | 0.44% | 0.30% |
| Comparative experimental example 1 | 1.34% | 1.13% | 0.86% | 1.02% | 0.75% | 0.56% |
| Comparative experimental example 2 | 1.55% | 1.32% | 1.04% | 1.44% | 1.09% | 0.77% |

Table 1 reveals that use of the barrier layer formed in a band shape composed of the intermediate bonding layer exhibiting the above-described adhesiveness (A) and moisture resistance (B) achieves excellent moisture-proof property as compared to the case of using a band-shaped layer formed of the resin to be used for the intermediate bonding layer in conventional laminated glass similarly.

Examples 1 to 3

Figure 5:
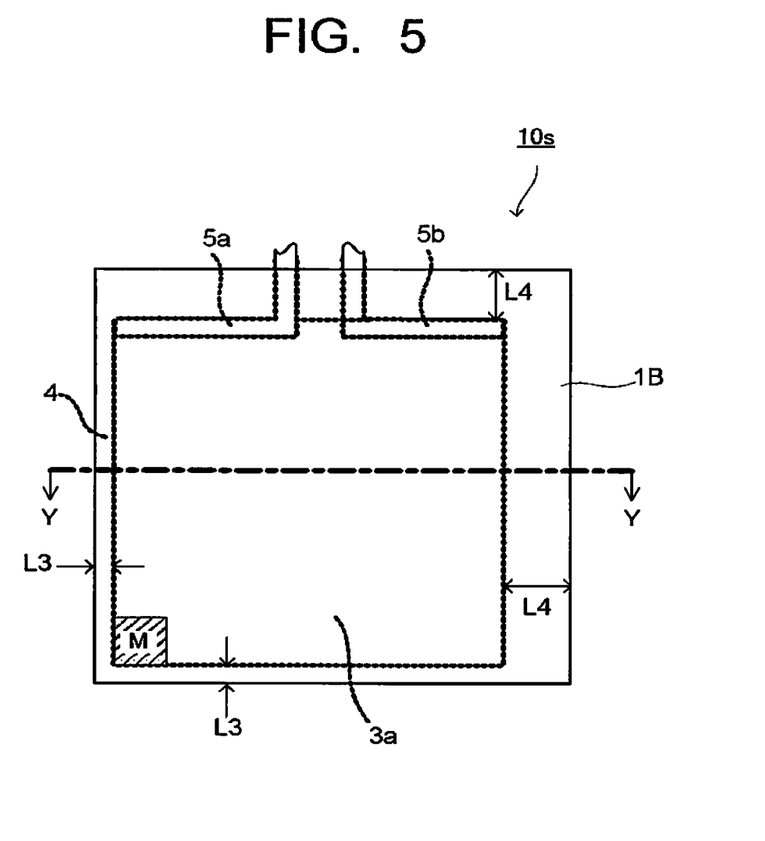
FIG. 5 is a front view of a laminated glass in Example 1.
Figure 6:
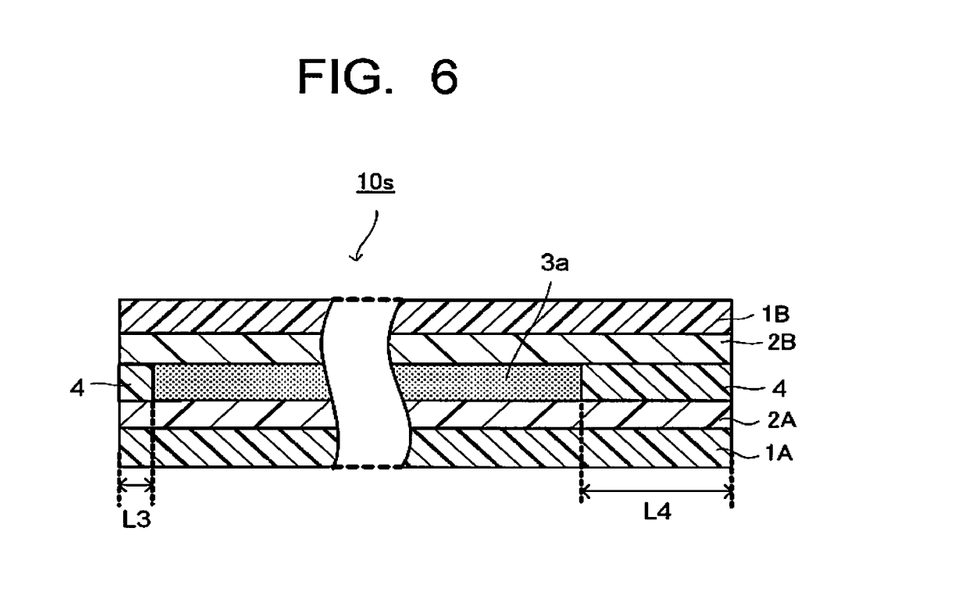
FIG. 6 is a cross-sectional view taken along a line Y-Y of the laminated glass illustrated in FIG. 5.

A laminated glass 10s having the same configuration as that of the laminated glass 10 explained as one example of the embodiment in the above and illustrated in FIGS. 1, 2 and whose front view is illustrated in FIG. 5 and whose cross-sectional view taken along a line Y-Y is illustrated in FIG. 6, were fabricated as follows. Incidentally, an SPD film 3a was used for the laminated glass 10s.

(Fabrication of Laminated Glass)

On one glass plate 1A (150 mm×150 mm, 2 mm thick) made of soda lime glass, an intermediate bonding layer 2A composed of the adhesive resin composition (Ia) film fabricated in the above of 150×150 mm, 0.38 mm thick was arranged so that its four sides were substantially aligned with four sides of the glass plate 1A.

As the SPD film 3a, an SPD film obtained by cutting a 0.32 mm thick LCF-1103DHA 65 (product name) manufactured by Hitachi Chemical Co., Ltd., into a size of 130×130 mm and having two bus bars 5a, 5b for operation and a cable (not illustrated) attached to one side of the SPD film was prepared. The SPD film 3a was arranged on the intermediate bonding layer 2A so that adjacent two sides of the SPD film 3a, not having the bus bars 5a, 5b were each located on the inside by a distance L3 (unit [mm]) from adjacent two sides of the glass plate 1A and the intermediate bonding layer 2A. Thereby, the side having the bus bars 5a, 5b and a side adjacent thereto of the SPD film 3a were located on the inside by 150−130−L3=L4 [mm] from the corresponding sides of the glass plate 1A and the intermediate bonding layer 2A.

Here, the laminated glasses were fabricated respectively in a manner that L3 was set to 3 mm (L4 was set to 17 mm) in Example 1, L3 was set to 5 mm (L4 was set to 15 mm) in Example 2, and L3 was set to 10 mm (L4 was set to 10 mm) in Example 3.

Next, on the intermediate bonding layer 2A, a barrier layer 4 in a frame shape having the same outer dimensions as those of the glass plate 1A and the intermediate bonding layer 2A (150×150 mm) and having the same inner dimensions as those of the SPD film 3a (130×130 mm) (having widths of L3 mm, L3 mm, L4 mm, and L4 mm at four sides respectively) was arranged so that its four sides were aligned with the four sides of the glass plate 1A and its inner edge came into contact with an outer edge of the SPD film 3a. Incidentally, the barrier layer 4 was composed of the 0.38 mm thick adhesive resin composition (Ia) film fabricated in the above.

Further, in a manner to cover the whole main surfaces of the barrier layer 4 and the SPD film 3a, one adhesive resin composition (Ia) film that was the same as that used for the above-described intermediate bonding layer 2A was overlaid as an intermediate bonding layer 2B on them, and further one glass plate that was the same as that used for the above-described glass plate 1A was overlaid as a glass plate 1B on the intermediate bonding layer 2B, in order without displacement, and their four sides were fixed with a slip prevention tape, and thereby a laminate was fabricated.

This laminate was put in a vacuum bag and subjected to pre-compression bonding at 110° C. while performing deaeration so as to obtain a pressure reduction degree of a-60 kPa or less in the vacuum bag, and then further subjected to main compression bonding under conditions of a temperature of 110° C. and a pressure of 1.3 MPa, and thereby the laminated glass 10s having the barrier layer 4 in a frame shape and the SPD film 3a on the inside of the barrier layer 4 was obtained.

Comparative Examples 1 to 3

Laminated glasses in Comparative examples 1 to 3 were fabricated similarly to the Examples 1 to 3 except that the intermediate bonding layer 2A, the intermediate bonding layer 2B, and the barrier layer of the laminated glass 10s in the Examples 1 to 3 were composed of a 0.4 mm thick EVA film (manufactured by TOSO NIKKEMI CORPORATION, Mersen G7060 (product name)).

(Moisture-Proof Property Evaluation)

In each of the laminated glasses obtained in the above-described Examples 1 to 3 and Comparative examples 1 to 3, a 20 mm×20 mm square portion from a corner formed by two sides in contact with the two sides of the SPD film 3a where the width of the barrier layer was L3 was set to a measurement portion (denoted by M in FIG. 5), and its total light transmittance (Tv) was measured using a Haze Guard Plus manufactured by BYK Gardner. Incidentally, the measurement of Tv was performed in both the case of the SPD film 3a being in a transparent state and the case of the SPD film 3a being in a colored state. The transparent state and the colored state of the SPD film 3a were set in a manner that two cables in the above-described laminated glass 10s were connected to an AC power supply and the power supply was turned on/off, and then the case of the power supply being on was the transparent state and the case of the power supply being off was the colored state. The voltage when the power supply was on was set to 100 V.

Tv obtained by the above-described measurement was set to Tv(b) of an initial state. Thereafter, there was performed a test in which the laminated glasses obtained in the above-described Examples 1 to 3 and Comparative examples 1 to 3 were let stand in a thermohygrostat at 60° C. and a humidity of 95% RH for 1000 hours. Each of the laminated glasses after the test was taken out of the thermohygrostat and returned to normal temperature, and then Tv of each of the laminated glasses was measured in both the case of the SPD film 3a being in a transparent state and the case of the SPD film 3a being in a colored state similarly to the above. Tv after the test was set to Tv(a). A Tv change rate (%) was obtained by Expression (X) below from Tv(a) and Tv(b) under each condition in each of the examples. An initial value (Tv(b)) and a value after the test (Tv(a)) of Tv under each condition in each of the examples, and the Tv change rate (%) are illustrated in Table 2 together with the width L3 of the barrier layer 4 in the vicinity of the measurement portion M.

$$Tv \text{ change rate } (\%)=Tv(a)/Tv(b)\times 100 \quad\quad\quad (X)$$

TABLE 2

| Example | L3(mm) | Power supply | Measurement time | Tv(%) | tv change rate (%) |
|---|---|---|---|---|---|
| Example 1 | 3 | Off | Initial | 3.0 | 110 |
| | | | After test | 3.3 | |
| | | On | Initial | 60.1 | 103 |
| | | | After test | 61.9 | |
| Example 2 | 5 | Off | Initial | 2.8 | 118 |
| | | | After test | 3.3 | |
| | | On | Initial | 60.2 | 103 |
| | | | After test | 62.3 | |
| Example 3 | 10 | Off | Initial | 3.0 | 100 |
| | | | After test | 3.0 | |
| | | On | Initial | 60.0 | 102 |
| | | | After test | 61.4 | |
| Comparative example 1 | 3 | Off | Initial | 3.0 | 200 |
| | | | After test | 6.0 | |
| | | On | Initial | 59.3 | 88 |
| | | | After test | 52.3 | |
| Comparative example 2 | 5 | Off | Initial | 2.9 | 171 |
| | | | After test | 5.0 | |
| | | On | Initial | 59.9 | 87 |
| | | | After test | 52.2 | |

TABLE 2-continued

| Example | L3(mm) | Power supply | Measurement time | Tv(%) | tv change rate (%) |
|---|---|---|---|---|---|
| Comparative example 3 | 10 | Off | Initial | 3.0 | 141 |
| | | | After test | 4.2 | |
| | | On | Initial | 59.9 | 88 |
| | | | After test | 52.7 | |

Table 2 reveals that use of the barrier layer formed in a frame shape composed of the adhesive resin composition (I) suppresses deterioration of the SPD film as compared to the case of using a frame-shaped layer formed of the resin to be used for the intermediate bonding layer in conventional laminated glass similarly.

EXPLANATION OF REFERENCE NUMERALS 10, 10s . . . laminated glass, 1A, 1B . . . glass plate, 2A, 2B . . . intermediate bonding layer, 3 . . . SPD film, 3a . . . SPD film, 4 . . . barrier layer, 5a, 5b . . . bus bar

What is claimed is:

1. A laminated glass for vehicle, comprising:
a pair of glass plates opposing each other;
a pair of intermediate bonding layers in contact with opposing surfaces of the pair of glass plates respectively;
a suspended particle device film arranged in a predetermined region in a region corresponding to a region except at least a part of band-shaped regions of peripheral edge portions of a main surface of the glass plate, between the pair of intermediate bonding layers; and
a barrier layer arranged in the band-shaped regions between the pair of intermediate bonding layers and having the following adhesiveness (A) and the following moisture permeability (B),
the adhesiveness (A): an adhesive strength to the glass plate is 40 N/25 mm or more, which is measured in conformity with JIS K 6864-2: 1999 under conditions of an adhesion temperature of 110° C., a test piece width of 25 mm, a testing rate of 300 mm per minute, and a peel angle of 180 degrees, and
the moisture permeability (B): a moisture permeability at a temperature of 40° C. and a humidity of 90% RH measured in conformity with JIS Z 0208: 1976 is 50 g/m$^2$·day or less,
wherein a layer having a planar shape corresponding to the shape of the main surface of the glass plate is formed by the suspended particle device film and the barrier layer between the pair of the intermediate bonding layers.

2. The laminated glass for vehicle according to claim 1, wherein a planar shape of the barrier layer is a frame shape, and the suspended particle device film is arranged to make an end face thereof come into contact with an end face on an inside of the barrier layer in the predetermined region that is a whole region excepting an arrangement region of the barrier layer from the region corresponding to the main surface of the glass plate.

3. The laminated glass for vehicle according to claim 1, wherein at least one of the pair of intermediate bonding layers has both the adhesiveness (A) and the moisture permeability (B).

4. The laminated glass for vehicle according to claim 1, wherein the barrier layer is a resin containing a modified block copolymer hydride [3] obtained by introducing an alkoxysilyl group into a block copolymer hydride [2] obtained by hydrogenating 90% or more of all unsaturated bonds of a block copolymer [1], the block copolymer [1] being composed of at least two polymer blocks [A], each containing a repeating unit derived from an aromatic vinyl compound as a main component, and at least one polymer block [B] containing a repeating unit derived from a chain conjugated diene compound as a main component and having a ratio of wA to wB (wA:wB) being 30:70 to 60:40 when a mass fraction of the all polymer blocks [A] to the entire block copolymer is set to wA and a mass fraction of the all polymer blocks [B] to the entire block copolymer is set to wB.

5. The laminated glass for vehicle according to claim 1, wherein at least one of the pair of intermediate bonding layers is a resin containing a modified block copolymer hydride [3] obtained by introducing an alkoxysilyl group into a block copolymer hydride [2] obtained by hydrogenating 90% or more of all unsaturated bonds of a block copolymer [1], the block copolymer [1] being composed of at least two polymer blocks [A], each containing a repeating unit derived from an aromatic vinyl compound as a main component, and at least one polymer block [B] containing a repeating unit derived from a chain conjugated diene compound as a main component and having a ratio of wA to wB (wA:wB) being 30:70 to 60:40 when a mass fraction of the all polymer blocks [A] to the entire block copolymer is set to wA and a mass fraction of the all polymer blocks [B] to the entire block copolymer is set to wB.

6. The laminated glass for vehicle according to claim 1, wherein the barrier layer has a portion whose width is 10 mm or less.

7. The laminated glass for vehicle according to claim 1, wherein the maximum width of the barrier layer is 10 mm.

8. The laminated glass for vehicle according to claim 1, not comprising a black ceramic layer.

9. The laminated glass for vehicle according to claim 1, further comprising:
a functional film between the pair of glass plates and the pair of intermediate bonding layers.

10. The laminated glass for vehicle according to claim 1, wherein a thickness of the barrier layer is substantially the same as a thickness of the suspended particle device film.

* * * * *